United States Patent
Cobb et al.

[11] 3,819,223
[45] June 25, 1974

[54] KAMP-TOP

[76] Inventors: Earnest G. Cobb; Larry J. Reasnor, both of c/o George Spector, 3615 Woolworth Bldg., 233 Broadway, Fort Bliss, Tex. 10007

[22] Filed: Nov. 28, 1972

[21] Appl. No.: 310,120

[52] U.S. Cl. .................... 296/26, 296/23 R, 188/69
[51] Int. Cl. ................................................ B60p 3/32
[58] Field of Search ........ 296/23 R, 23 MC, 26, 27; 188/31, 60, 67, 69

[56] References Cited
UNITED STATES PATENTS

| | | | |
|---|---|---|---|
| 2,243,659 | 5/1941 | Thompson | 296/23 R |
| 2,685,043 | 7/1954 | Durant | 188/69 |
| 2,766,638 | 10/1956 | Vice | 188/69 |
| 3,061,358 | 10/1962 | Lien | 296/26 |
| 3,160,435 | 12/1964 | Smith | 296/23 R |
| 3,298,661 | 1/1967 | Stam | 188/69 |
| 3,619,001 | 11/1971 | Borskey | 296/26 |

*Primary Examiner*—Philip Goodman
*Assistant Examiner*—John A. Carroll

[57] ABSTRACT

A vehicle is provided with a top secured to the vehicle's roof. The top carries a mattress and has a mounted retracted position as well as an upwardly extended position for use as a bed. A hand crank operates telescoping columns to raise or lower the top. Ends and sides of the attachment are enclosed.

1 Claim, 10 Drawing Figures

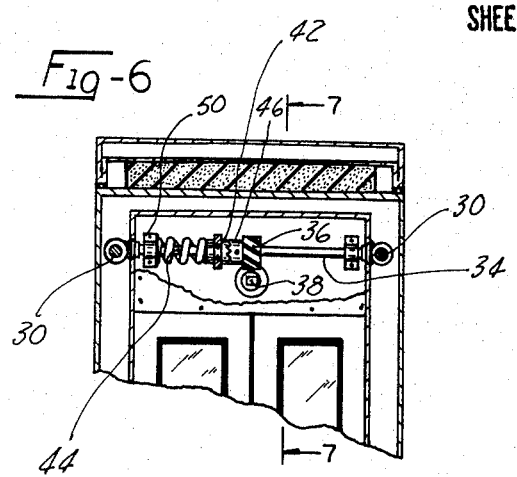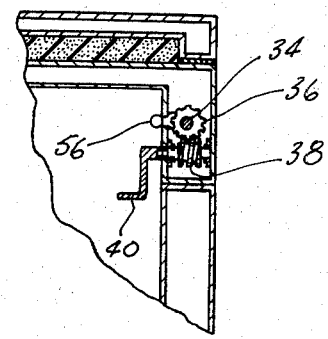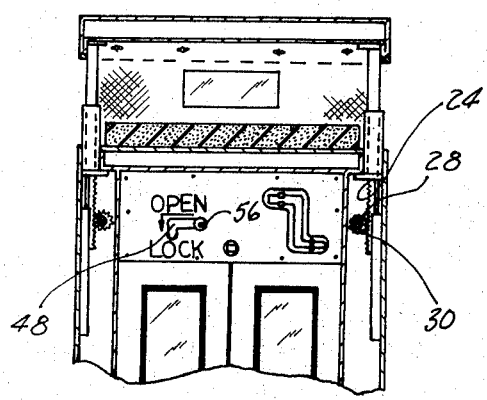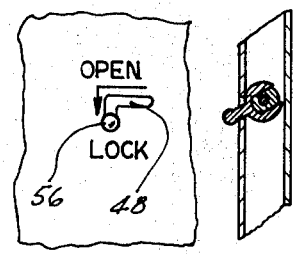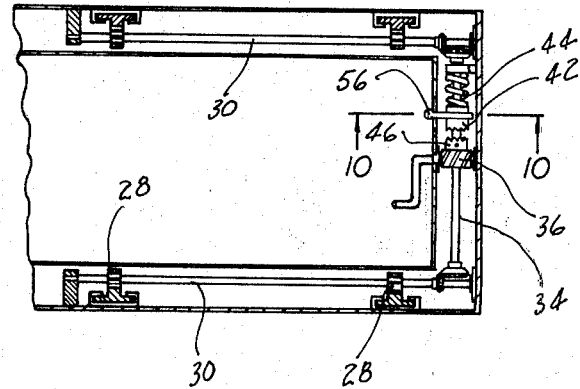

KAMP-TOP

SUMMARY OF THE INVENTION

Our invention is directed toward a device which can be built into the top of a vehicle and used as a bed. In closed position, the top resembles a factory installed top except that it is somewhat higher because of the thickness of a mattress disposed inside. By means of a hand crank, which operates telescoping columns, the roof of the device can be raised to a level at which use as a bed is conveniently available. The ends and sides are enclosed.

BRIEF DESCRIPTION OF THE DRAWINGS

In the drawings:

FIG. 6 is a view taken along line 6—6 of FIG. 4,

FIG. 7 is a view taken along line 7—7 of FIG. 6;

FIG. 8 is a view taken along line 8—8 of FIG. 5;

FIG. 9 is a view taken along line 9—9 of FIG. 5 and

FIG. 10 is a detail view of the locking lever for the control mechanism.

DETAILED DESCRIPTION OF PREFERRED EMBODIMENTS

Figure 1:
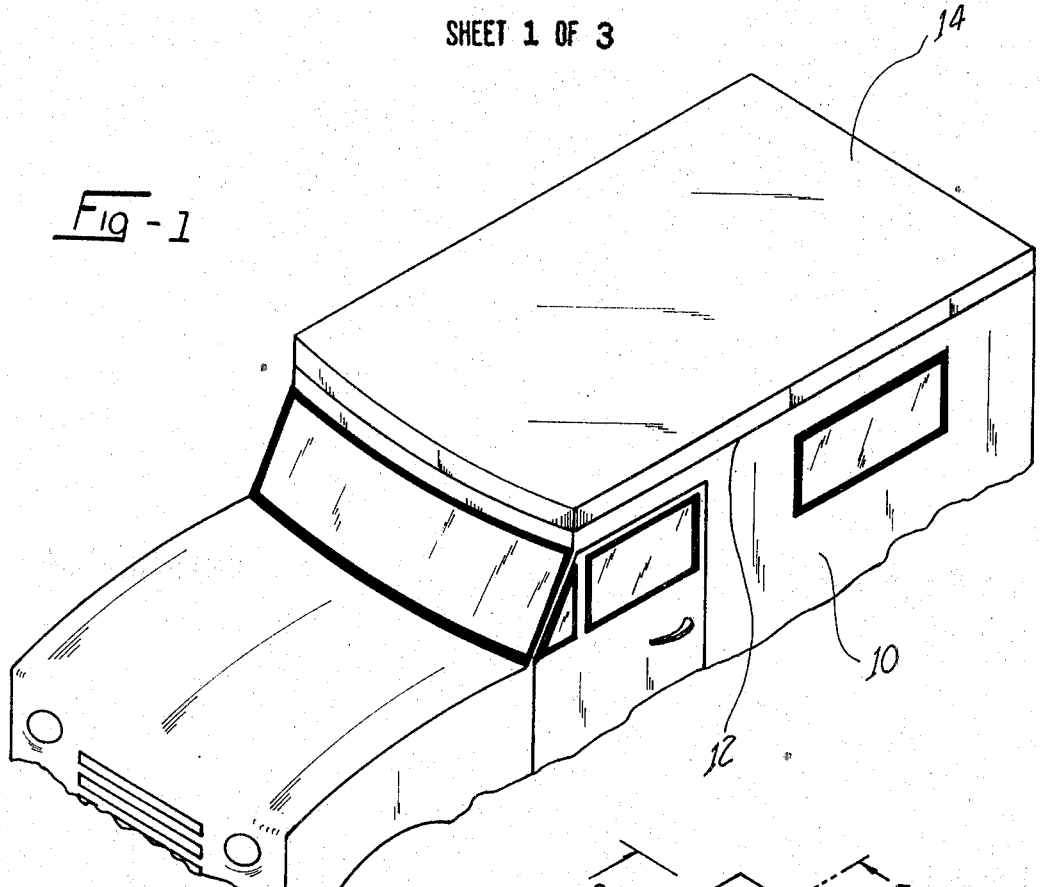
FIG. 1 is a perspective view of our invention in closed position.
Figure 2:
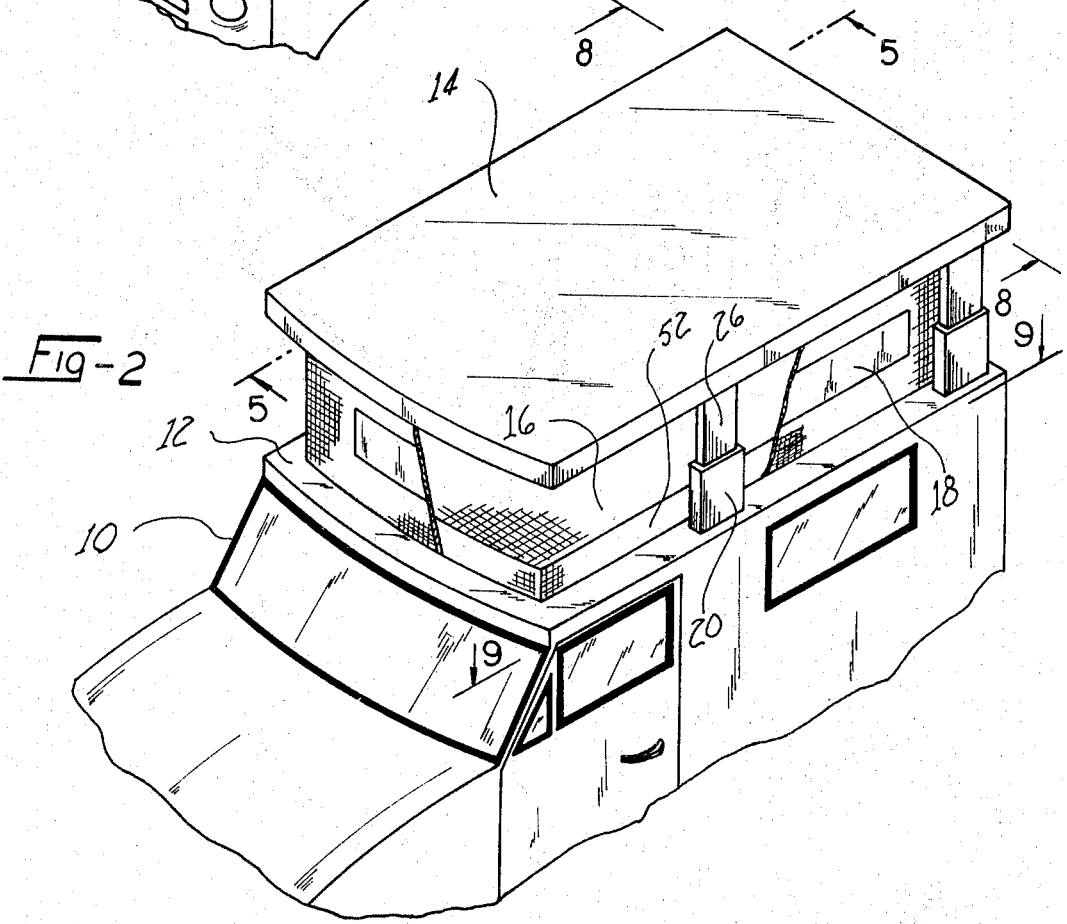
FIG. 2 is a perspective view of our invention in extended position for use.
Figure 3:
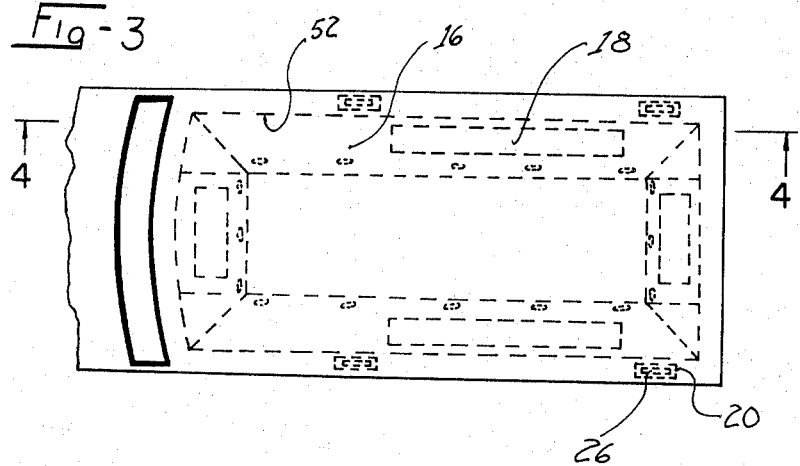
FIG. 3 is a top cut away view of our invention in closed position.
Figure 4:
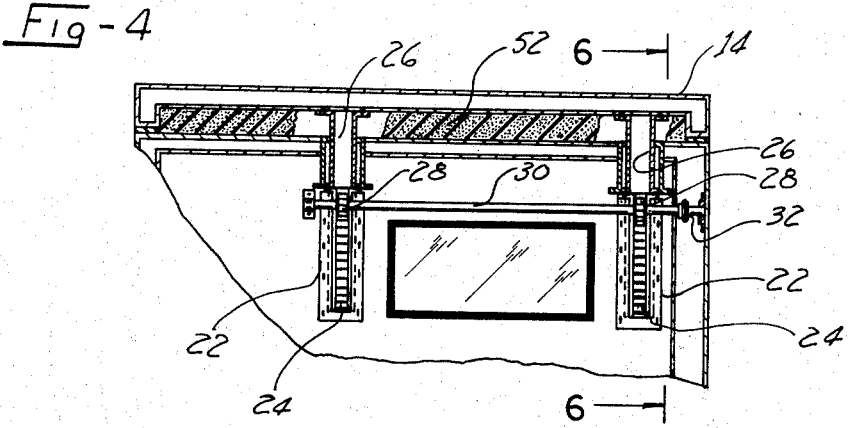
FIG. 4 is a view taken along line 4—4 in FIG. 3.
Figure 5:
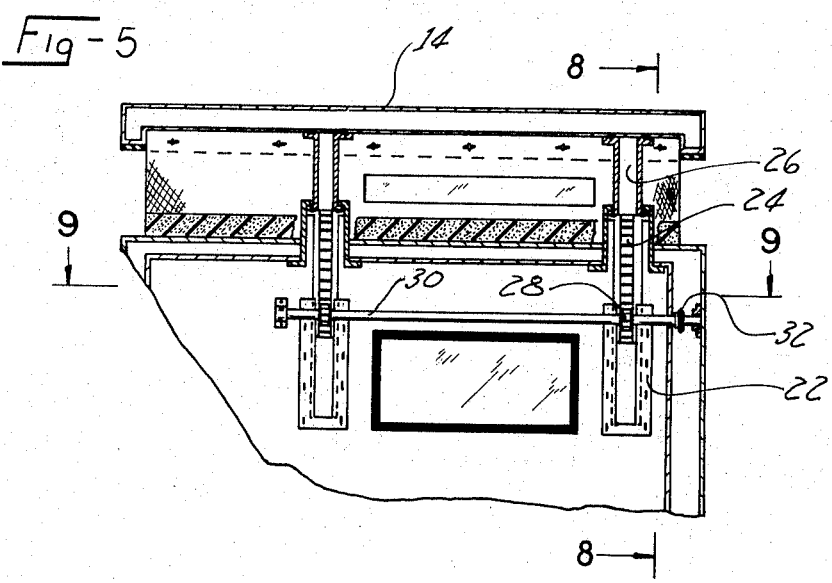
FIG. 5 is a view taken along line 5—5 of FIG. 2.

Referring now to FIGS. 1–10, the roof 12 of a vehicle 10 is surmounted by a second roof 14. When the invention is in closed position, roof 14 rests upon roof 12. When the invention is in raised position, the sides and ends between the raised roof 14 and the original roof 12 are closed by canvas 16 or the like, having windows 18. Mattress 52 is disposed below the roof.

Roof 14 is supported on four telescopic columns 20 disposed in suitable recesses or wells 22. Each column has a lower portion with a rack 24 which extends vertically upward and supports a vertical post 26.

Each rack cooperates with a corresponding pinion gear 28. These gears are secured in spaced position along horizontal shafts 30 and are rotated in vertical planes as the shafts are rotated in one direction or the inverse to raise or lower the racks and posts.

The two parallel elongated shafts each are connected by corresponding bevel gearing 32 to a transversely extending horizontal shaft 34. This shaft 34 supports a gear 36 cooperating with a rotatable worm gear 38 rotatable by crank 40.

Gear 38 has at one side a serrated cylinder 46 engagable with or disengagable from a mating cylinder 42. Shaft 34 extends through a bore in cylinder 42. A spring 44 bears between gearing 32 and cylinder 42, and is held non-rotatably by clamp 50.

In use, pin 56 is slid manually in slot 48 to the open position at which cylinder 42 is held out of contact with cylinder 46. Then rotation of the crank 40 turns the worm gear 38 to rotatate gear 36 and turn shaft 34. This shaft through gearing 32 turns shafts 30, rotating pinion gears 28 to move the racks 24 up or down to raise or lower the roof.

In order to lock the roof in either closed or extended position, pin 46 is slid manually to the lock position. This releases the spring 44 which pushes cylinder 42 into locking engagement with cylinder 46. This prevents gear 36 from rotating despite any attempt to turn the crank whereby the roof is locked into position.

While certain novel features of our invention have been shown and described and are pointed out in the annexed claims, it will be understood that various omissions, substitutions and changes in the forms and details of the device illustrated and in its operation can be made by those skilled in the art without departing from the spirit of the invention.

We claim as follows:

1. In combination with a vehicle having a first roof;

a second roof disposed on top of the first roof;

a plurality of vertically telescoping columns disposed in wells in the first roof and supporting the second roof, each column having a corresponding vertical rack and being adapted to be extended upward or recessed in the well to raise or lower the second roof by suitable vertical movement of the rack;

a manually operable crank;

a horizontal worm turned by the crank; and worm and racks to raise the roof when the worm is turned in one direction by the crank and to lower the roof when the worm is turned in reverse direction further including manually operable locking means having a first position at which the worm can be turned by operation of the crank and a second position at which neither crank nor worm can be turned and the second roof is locked either in raised or lowered position, wherein each rack cooperates with pinion gears constituting part of the mechanism and disposed on horizontal rotatable shafts constituting another part of the mechanism, wherein said mechanism includes two parallel horizontal rotatable shafts supporting the pinion gears and interconnected by bevel gears to a transversely extending rotatable horizontal shaft wherein the mechanism includes a drive gear on the transverse shaft which is rotatable by said worm, wherein the drive gear has a serrated cylinder on one side constituting part of the looking means, the locking means further including a second serrated cylinder spaced from the first cylinder to define the first position and engaging the first cylinder to prevent rotation of the drive gear to define the second position, wherein said second cylinder is spring loaded to bear against and engage the first cylinder unless moved away by manual action of a locking pin.

* * * * *